July 24, 1956 I. R. GOSHAW 2,756,278

MAGNETIC FILM ERASING METHOD AND SYSTEM

Filed May 13, 1950

INVENTOR:
IRL R. GOSHAW
BY Morris ... Rabkin
ATTORNEY

United States Patent Office 2,756,278

Patented July 24, 1956

2,756,278

MAGNETIC FILM ERASING METHOD AND SYSTEM

Irl R. Goshaw, Beverly Hills, Calif., assignor to Radio Corporation of America, a corporation of Delaware Application May 13, 1950, Serial No. 161,889

12 Claims. (Cl. 179—100.2)

This invention relates to sound reproduction, and particularly to the reproduction of a magnetic sound record.

With the advent of magnetic sound recording and reproduction, several problems have arisen because of the particular magnetizable medium being used. That is, the magnetizable medium may be a steel wire or a tape or film upon which a layer of finely divided iron oxide particles are deposited and cemented. In the recording of signals, there are periods when no signal is recorded, with the result that silent portions are interspersed with signal portions. Since the medium is magnetic, spurious magnetizations find their way into the silent portions of the sound record. These magnetizations may be caused by printing through from the signal portions when the tape or film is wound in a roll or by the silent portions of the film making contact with magnetic elements. The result is noise in the silent portions of the film, which is reproduced during the reproduction of the record.

The present invention is directed to an automatic system for "cleaning" the sound track of spurious magnetizations during record reproduction. The elimination of these noise spots is accomplished by an erase head, which may be either under control of the signal currents, or may be under the control of a relay operated by film markings, such as notches. When operated by the film, the silent portions may be cleaned before reproduction.

The principal object of the invention, therefore, is to automatically remove all spurious magnetizations in a magnetic sound record where the record is and should be silent.

Another object of the invention is to provide an improved method of and system for removing spurious magnetizations in the silent portions of a magnetic record during reproduction of the record.

A further object of the invention is to provide a magnetic erasing circuit controlled by the reproduced signal on the magnetic record.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
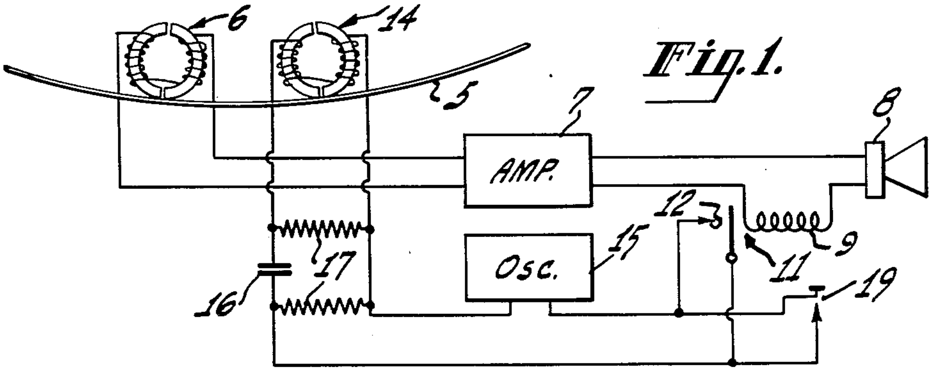
Fig. 1 is a combination schematic and diagrammatic view of one embodiment of the invention.

Referring now to Fig. 1, a magnetic record on a magnetizing medium 5 is shown being reproduced by a magnetic reproduce head 6 feeding an amplifier 7 connected to a loudspeaker 8. The output of the amplifier is fed over winding 9 of a slow-to-make relay 11 having a contact 12.

A magnetic erase head 14 is also provided in contact with the record medium 5, the erase head being supplied with erase currents from an oscillator 15 over a series blocking condenser 16 and shunt resistors 17. Current from the oscillator 15 is supplied to the erase head 14 when either the contact of the manual switch 19 is closed or contact 12 of relay 11 is closed.

To operate the above system, any signal detected by the head 6 and amplified by the amplifier 7 will maintain contact 12 open during the reproduction of the signal. However, as soon as the signal ceases, the relay 11 will make contact 12 and impress erasing currents on the head 14. Since there must be some physical separation between the reproduce head 6 and erase head 14, the relay 11 is set so as to permit the end of the signal portion to reach or just pass the gap of the erase head 14 before application of the erasing currents.

Figure 2:
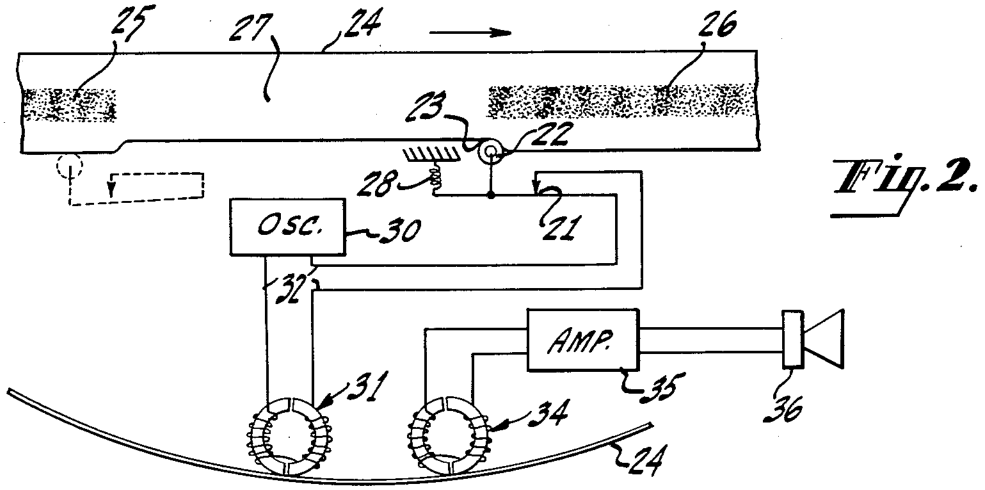
Fig. 2 is a combination diagrammatic and schematic view of another embodiment of the invention.

Referring now to Fig. 2, a simple notched film system is illustrated, whereby a contact 21 is made when the roller 22 drops into the notch 23 in the film 24 under tension of a spring 28. On the film 24, two signal portions 25 and 26 and a silent portion 27 are illustrated. It is understood, of course, that the magnetic track is invisible and is shown visible only for purposes of illustration. It will be noted that the notch 23 extends from the end of the signal portion 26 to the beginning of the signal portion 25. Thus, as soon as the roller 22 drops into the notch, erasing currents will be supplied from an oscillator 30 to the erase head 31 over conductors 32 and contact 21. When the end of the notch 23 reaches the roller, the contact 21 will be broken, as shown by the dotted lines. In this manner, the erase currents will clean up the silent portion 27 before being detected by reproduce head 34 connected to an amplifier 35 and a loudspeaker 36. The film 24 is shown in two positions to illustrate its contact with the two heads 31 and 34.

Figure 3:
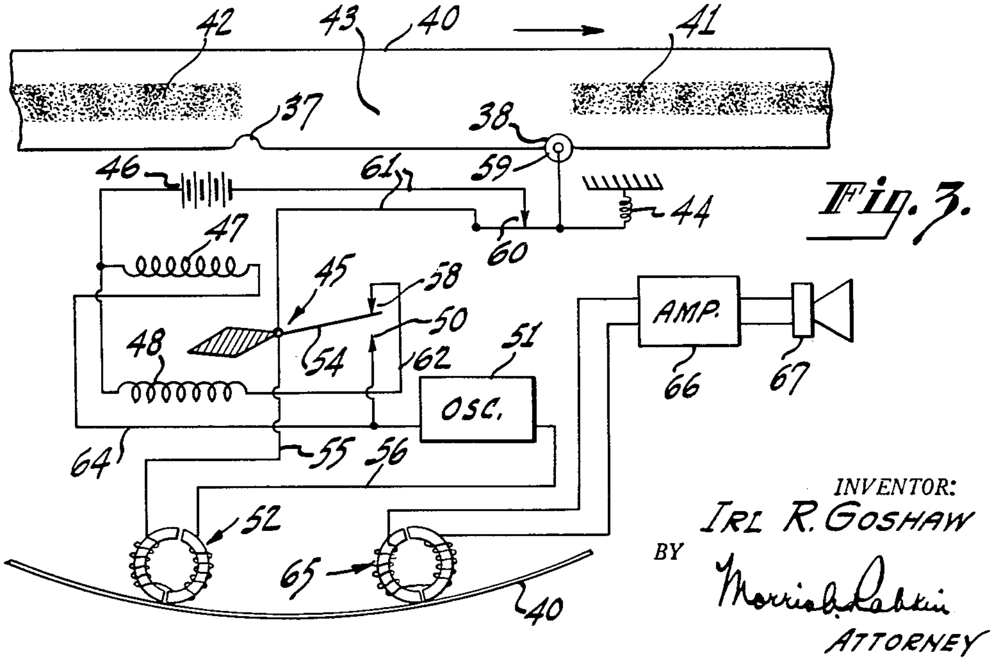
Fig. 3 is a combination schematic and diagrammatic view of a third modification of the invention.

Since the lengths of the silent portions are quite long in many instances, it has been found that the oscillator erase current may be turned on and off by single circular notches, such as shown at 37 and 38 in Fig. 3. These notches are in a film 40 having signal portions 41 and 42 and a silent portion 43.

The system of Fig. 3 employs a polarized relay 45 which is energized from a battery 46 over windings 47 and 48. When contact 50 of the relay 45 is made, erase current from an oscillator 51 will be supplied to erase head 52 over contact 50, armature 54, and conductors 55 and 56. When the polarized relay 45 is in the position shown in the drawing, whereby contact 58 is made, no erasing current will be supplied to the head 52.

To explain the operation of this circuit, when the roller 59 is pulled into the notch 38 by a spring 44, contact 60 is made, and energy from the battery 46 is supplied to winding 48 over conductors 61, winding 48, conductor 62, contact 58, and armature 54. The energization of winding 48 throws armature 54 to contact 50 and applies erase current to the head 52. The roller 59 may then be moved to the edge of the film, breaking contact 60, but the erase current will still be supplied to the head. At the end of the silent period, when the roller 59 drops into the notch 37, contact 60 will again be made, which will energize winding 47 over conductors 61, battery 46, winding 47, conductor 64, contact 50, and armature 54. Energization of winding 47 breaks contact 50 and throws the armature 54 to contact 58, which eliminates the erasing current from the head 52. Thus, any spurious magnetizations in the silent portions of the film, such as shown at 43, will be eliminated before reproduction. Reproduction is provided by a reproduce head 65 connected to an amplifier 66 and a loudspeaker 67. The film 40 is also shown in contact with the heads 52 and 65 for purposes of illustration.

Thus, the above circuits provide systems whereby the silent portions of a magnetic film may be maintained free from spurious magnetizations. In one form, the application of the erasing currents is controlled by the signal current, and in other modifications, the application of the erasing current is controlled by film-operated relays. Such a clean up procedure is particularly important in sound record rerecording systems, wherein sound records are reproduced many times during rehearsals and rewound between each rehearsal. Since the film is handled a great deal, spurious magnetizations are frequently introduced into the silent portions of the track where they are particularly noticeable. The above automatic systems maintain the silent portions of the sound tracks free from spurious magnetizations.

I claim:

1. The method of eliminating noise caused by splices and spurious magnetizations in the silent portions of a magnetic sound record during each reproduction of said record, comprising advancing a magnetic sound record, magnetically reproducing the sound portions of said record, totally erasing the spurious magnetizations in the silent portions of said record as said record is advanced for reproduction, and controlling the erasing of said spurious magnetizations in said silent portions by the movement of said record during each reproduction of said record.

2. A system for automatically removing spurious magnetism in the silent portions of a magnetic sound record in a magnetic record strip having sound record portions and silent portions in serial order during each reproduction of said record, a magnetic record strip having sound portions and silent portions in serial order comprising means for advancing said strip, a magnetic reproduce head adapted to detect said sound portions, an erase head adapted to completely erase any magnetizations in said silent portions of said strip, an erasing current supply source connectable to said erase head, and means under control of the movement of said record strip for connecting and disconnecting said erasing current source to and from said erase head.

3. A system for erasing spurious magnetism in the silent portions of a magnetic record in a magnetic medium during each reproduction of said record, comprising an erasing head adapted to contact for completely erasing any magnetizations in said silent portions, a reproducing head adapted to contact and adjacent said erasing head, a sound record reproducing circuit connected to said reproducing head, an oscillator, and a relay circuit for connecting said oscillator to said erasing head during the passage of said silent portions past said erasing head during each reproduction of said record.

4. A system in accordance with claim 3, in which said relay circuit is connected in said reproducing circuit, said relay circuit being energized by the signal currents in said reproducing circuit.

5. A system in accordance with claim 3, in which said relay circuit is controlled by notches in said magnetic medium.

6. The method of erasing noise caused by spurious magnetization in the silent portions of a magnetic sound record during each reproduction of said record, comprising advancing said magnetic sound record past and in contact with magnetic reproduce and erase heads, generating an erasing current for impression on said erase head said current being of sufficient strength to completely erase any magnetization in the silent portions of said record during each reproduction of said record, and controlling the impression and elimination of said erase current by the currents of said reproduced record, the cessation of said record currents causing the impression of said erase currents on said record.

7. The method in accordance with claim 6, in which the impression of said erase currents is subsequent to the reproduction of said record currents.

8. A system for applying erasing energy to the silent portions interspersed between signal sections of a magnetic sound record during each reproduction of said record, comprising an oscillator for supplying erasing energy, an erasing head for completely erasing any magnetizations in said silent portions, a relay circuit adapted to connect said oscillator to said head at the end of each signal section and disconnect said oscillator from said head at the beginning of each signal section, and a film-operated switch in said relay circuit adapted to make and break an oscillator contact at the end and beginning of each signal section during the reproduction of said record.

9. The method of applying erasing energy to the silent portions interspersed between signal sections of a magnetic sound record during each reproduction of said record, comprising notching the film carrying said magnetic sound record at the end and beginning of each of said signal sections, generating erasing energy, applying said erasing energy to completely erase said record, said application being under control of the notches at the end of said signal sections, and removing said erasing energy from said record, said removing being under control of the notches at the beginning of said signal sections during each reproduction of said record.

10. The method of eliminating noise caused by splices and spurious magnetizations in the silent portions of a magnetic sound record medium during each reproduction of said record medium, which comprises the step of subjecting the silent portions of said medium carrying such spurious magnetizations to an alternating current field of sufficient strength to completely erase said magnetizations in the silent portions of said medium during each reproduction of said medium, and the step of eliminating said field in the signal portions of said medium.

11. The method in accordance with claim 10, in which said subjecting and eliminating of said field from said medium are controlled by the movement of said medium.

12. A system for eliminating noise caused by splices and spurious magnetizations in the silent portions of a magnetic sound record medium during each reproduction of said record medium, comprising means for generating an alternating current field, means for subjecting the silent portions of said record medium to said field sufficient to completely erase any magnetizations in said silent portions, said means eliminating said field in the signal portions of said record medium, and means under control of the movement of said medium for controlling the subjecting and eliminating of said field from the respective portions of said record medium.

References Cited in the file of this patent

UNITED STATES PATENTS

| | | |
|---|---|---|
| 1,810,527 | Owens | June 16, 1931 |
| 2,160,252 | Meyer | May 20, 1939 |
| 2,610,257 | Wissmann | Sept. 9, 1952 |

FOREIGN PATENTS

| | | |
|---|---|---|
| 218,407 | Switzerland | Mar. 16, 1942 |
| 685,227 | Great Britain | Dec. 31, 1952 |
| 881,562 | France | Jan. 28, 1943 |